United States Patent [19]

von Gaisberg et al.

[11] Patent Number: 5,093,554
[45] Date of Patent: Mar. 3, 1992

[54] AUTOMATICALLY FITTABLE AND ILLUMINATED ELECTRIC CIGAR LIGHTER

[75] Inventors: Alexander von Gaisberg, Beilstein; Klaus-Philipp Merz, Karlsruhe, both of Fed. Rep. of Germany

[73] Assignee: Schoeller & Co., Elektrotecnische Fabrik GmbH & Co., Frankfurt, Fed. Rep. of Germany

[21] Appl. No.: 518,706

[22] Filed: May 7, 1990

[51] Int. Cl.[5] .............................................. F21V 33/00
[52] U.S. Cl. ..................................... 219/267; 219/269; 362/80; 362/92
[58] Field of Search .................... 219/265, 266–267, 219/269, 263, 264, 260; 362/92, 80, 109, 119, 32

[56] References Cited

U.S. PATENT DOCUMENTS

| | | | |
|---|---|---|---|
| 2,201,952 | 5/1940 | Cohen | 219/32 |
| 2,506,181 | 5/1950 | Thibauit et al. | 219/32 |
| 2,514,171 | 7/1950 | Waltner, Jr. | 219/265 |
| 3,125,662 | 3/1964 | Alvarez et al. | 219/32 |
| 3,134,885 | 5/1964 | Pramaggiore et al. | 219/264 |
| 3,560,705 | 2/1971 | Mendehall | 219/267 |
| 3,643,062 | 2/1972 | Ohinata | 219/265 |
| 3,903,408 | 9/1975 | Seibel et al. | 219/267 |

FOREIGN PATENT DOCUMENTS

| | | |
|---|---|---|
| 0268861 | 10/1987 | European Pat. Off. |
| 1834788 | 5/1961 | Fed. Rep. of Germany |
| 2254712 | 8/1973 | Fed. Rep. of Germany |
| 7321282 | 10/1973 | Fed. Rep. of Germany |
| 7323648 | 10/1973 | Fed. Rep. of Germany |
| 2329040 | 1/1975 | Fed. Rep. of Germany |
| 2203163 | 5/1975 | Fed. Rep. of Germany |
| 2535080 | 2/1977 | Fed. Rep. of Germany |
| 2755620 | 7/1978 | Fed. Rep. of Germany |
| 2948723A1 | 7/1980 | Fed. Rep. of Germany |
| 3001367 | 7/1980 | Fed. Rep. of Germany |
| 3421340A1 | 5/1985 | Fed. Rep. of Germany |
| 3445326 | 6/1985 | Fed. Rep. of Germany |
| 2295853 | 12/1974 | France |
| 2436939 | 9/1978 | France |
| 2444587 | 12/1979 | France |
| 2502078 | 3/1981 | France |
| 2495553 | 11/1981 | France |
| 767444 | 2/1957 | United Kingdom |
| 1139159 | 1/1969 | United Kingdom |
| 2029559 | 3/1980 | United Kingdom ............... 219/267 |

Primary Examiner—Bruce A. Reynolds
Assistant Examiner—John A. Jeffery
Attorney, Agent, or Firm—Armstrong, Nikaido, Marmelstein, Kubovcik & Murray

[57] ABSTRACT

An electric cigar lighter which can be fitted and illuminated automatically is disclosed. A reduction in parts of the electric cigar lighter, with the product being easier to fit in a dashboard, is achieved when the holding cup is additionally designed as a socket for the igniter plug having an incandescent head. A bimetallic spring contact electrically connected to the positive potential contact part, which in the operating state contacts an ignition dish of the incandescent head, is disposed on the inside wall area of the cup bottom, and at least one spring contact of the negative potential contact extends through the cup bottom to electrically contact and electrically engage with a conductive edge bead of the igniter plug. This means that the holding cup according to the present invention is used in an advantageous manner not only for illumination purposes, but also as a socket for the igniter plug.

30 Claims, 2 Drawing Sheets

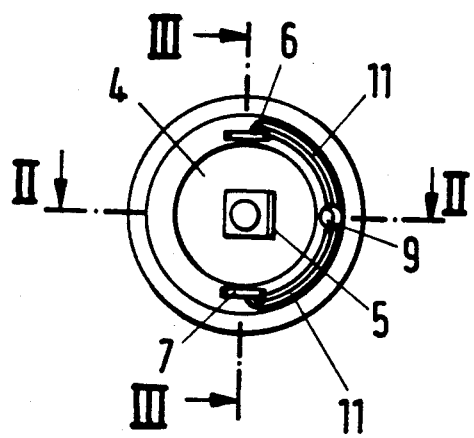
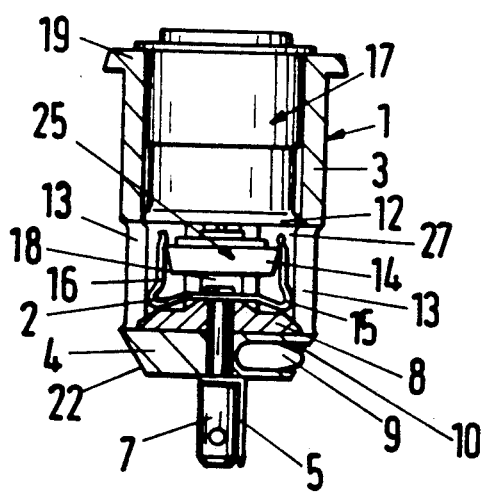
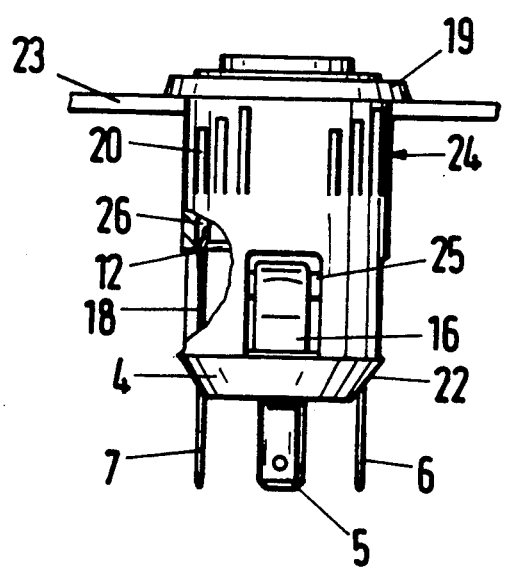

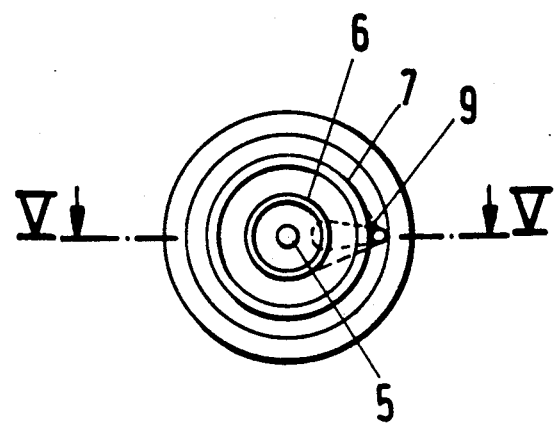
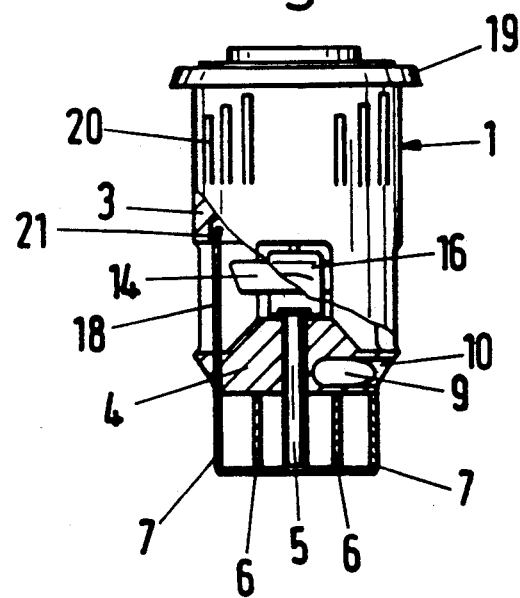

AUTOMATICALLY FITTABLE AND ILLUMINATED ELECTRIC CIGAR LIGHTER

Efficient fitting automation constitutes an essential rationalization potential of the future, in particular with increasing competition pressure, to exhaust all the rationalization reserves of production technology.

The electric cigar or cigarette lighter described in companion application U.S. Ser. No. 494,382 (unofficial) (attorney Docket 900166), of von Gaisberg et al, filed Mar. 16, 1990, is capable of being further improved as regards a product design which is adapted to fitting needs, the latter being a precondition for efficient automation of fitting. In addition to a cup-shaped holding sleeve, the prior product design also has a metal socket which is placed therein, and which in turn is used to accommodate an igniter plug with incandescent head. Apart from the fact that the cup-shaped holding sleeve and the socket are designed as two individual parts of different materials, the fitting of the socket in the cup-shaped holding sleeve, which has to be carried out at the supplier's factories, also means an additional fitting step.

It is therefore the object of the invention to develop further the cigar lighter according to the above companion application Ser. No. 494,382, while avoiding the above-mentioned disadvantages, in such a way that the improved lighter undergoes an additional reduction in parts and a further simplification of fitting.

Due to the fact that the holding cup is also designed as a socket for the igniter plug of the cigar lighter, there is no need for a socket inserted separately in the holding cup. Since the bottom and walls of the holding cup are made of electrically insulating and light-conducting material, preferably of Makrolon, there is also no need for an insulating part provided between a positive potential contact part together with bimetallic spring contact and the metal socket cup bottom traditionally serving as ground contact.

If, as in a preferred embodiment, the holding cup is made not only of light-conducting and electrically insulating, but also of highly heatproof, thermally insulating material, the bimetallic spring contacting the igniter dish of the ignition plug can be provided directly on the inside wall of the cup bottom of the holding cup; otherwise, for safety reasons, a separate highly heatproof thermally insulating part must be placed between the cup bottom and the bimetallic spring contact. The thermally insulating part can also be made as an insert which replaces the bottom of the cup. In order to ensure the ground circuit of the igniter plug, in the cigar lighter according to the invention a spring contact of a negative potential contact part extends through the cup bottom of the holding cup, and the spring contact makes electrical contact and engages with an edge bead of the igniter plug. The bimetallic spring contact, having a bimetallic spring, can be provided with an additional contact strip which is then in conducting connection with a contact part.

In an advantageous further embodiment of the invention provision is also made for the cup bottom to be chamfered conically in the form of a truncated cone. This means that the assembly robot tolerates slight alignment deviations when picking up the lighter parts, so that a non-obstructive insertion of the holding cup is always guaranteed.

Conveniently the contact parts can also be designed as contact lugs or surfaces, in conjunction with a T-shaped or I-shaped arrangement of the contact parts, by which means a desired coding of the contact parts for the azimuthal alignment of the holding cup is also provided.

In a particularly advantageous further embodiment, it has been found expedient to arrange the contact parts, which extend through the cup bottom, in the form of a coaxial connection. In this case strip-type light passage slits can be provided in the hollow cylindrical, coaxially arranged annular contacts, so that the light of a lamp preferably arranged centrally and axially in the cup bottom can pass into the material of the cup wall. The coaxial connection can, however, also be arranged at the connection plug side outside on the bottom of the holding cup, which means that light transmission slits are then not necessary. With this particularly preferred coaxial connection embodiment, in addition to the rotationally symmetrical design of the holding cup according to the invention, a rotationally symmetrical arrangement of the contact parts and the lamp is thus also produced, which permits automatic assembly entirely independent of azimuthal orientation or direction of the holding cup.

According to a further embodiment, the lamp socket can be constructed off-center or centered axially in the cup bottom and can be of open design on the connection plug side. By this means, the lamp itself can be installed in the connection plug, so that the place of greatest light density is within the cup bottom.

In another preferred embodiment, provision is made for the lamp socket to be arranged radially in the wall of the cup bottom, and in this case a centrally fixed contact part in the form of a contact lug penetrates a bore provided therein. In this way the advantages of a central arrangement of the contact parts is combined with the advantage of a centered arrangement of the lamp. The lamp connection wires in this arrangement may be welded directly to the appropriate contact parts.

Since the holding cup according to the invention can be installed in the dashboard of a motor vehicle by means of a single linear assembly movement of an assembly robot, it is expedient to provide a locking device on the holding cup. According to a preferred embodiment, several groups of clamping ribs of different lengths are therefore disposed rotationally symmetrically on the surface of the preferably hollow cylindrical cup wall of the holding cup. This rib arrangement ensures that a secure locking of the holding cup can be achieved in a simple manner with a single assembly movement, even with differing thicknesses of dashboards, with peripherally constant holding forces.

According to a particularly preferred embodiment, the arrangement of the clamping ribs, to provide locking of the holding cup which is adapted to assembly needs, is preferably made such that the ribs are equidistant and axially parallel. This arrangement ensures a rotationally symmetrical distribution of the locking forces. In a further embodiment the individual clamping ribs have run-on slopes, which permits easy insertion of the holding cup into a preferably thermoplastic dashboard.

According to a further embodiment of the invention, the cross-section profiles of the clamping ribs are made to be elastic, so that during the sliding-on operation the clamping ribs first spring in and then spring up again behind the slid-on dashboard. A virtually jolt-proof and torsion-resistant fitting of the holding cup in the dashboard is ensured by this embodiment.

The invention will be described and explained in greater detail below with reference to several exemplary embodiments and the schematic drawing, in which:

FIG. 1 shows a top view of the arrangement of the contact parts 5, 6, 7 according to a first exemplary embodiment of the cigar or cigarette lighter according to the present invention;

FIG. 2 shows a cross-sectional view of the cigar lighter according to the invention, taken along section line II—II of FIG. 1;

FIG. 3 shows a side view of the cigar lighter according to the invention, with a partial sectional view taken along section line III—III of FIG. 1;

FIG. 4 shows a top view of the arrangement of the contact parts 5, 6, 7 of the cigar lighter according to the invention in a second exemplary embodiment; and FIG. 5 shows a side view of the cigar lighter according to the invention, with a partial sectional view taken along section line V—V of FIG. 4.

FIG. 1 shows a top view of the arrangement of the contact parts 5, 6, 7 according to a first exemplary embodiment of the holding cup 1 according to the invention. A lamp 9 is fitted in a lamp socket 10 of a cup bottom 4 of the holding cup 1. A first positive potential contact part 5 contacting a bimetallic spring contact 16 is fixed centrally on the cup bottom 4. Lamp connection wires 11 are electrically connected to a second positive potential contact part 6 and a negative potential contact part 7.

FIG. 2 shows a cross-sectional view of the cigar lighter according to the present invention in the first exemplary embodiment. The first positive potential contact part 5 is fixed on the cup base 4 by means of a screw 2 extending through the cup bottom 4. The screw 2 also fixes the bimetallic spring contact 15 with the interposition of a thermally insulating part 8 of highly heatproof material on the inside wall area of the cup bottom 4. The thermally insulating part 8 preferably has protective walls 27 which congruently cover the wall parts of the cup wall 3 lying between the cup bottom 4 and a locking groove 21 (see FIG. 5). The bimetallic spring contact 15 preferably has a bimetallic spring 16 which is bent into a U-shape and which in the operating state, by its two legs, contacts the ignition dish 14, bearing a heating coil (not shown) associated with glow unit 25, of an igniter plug 17. Passages 13 in the cup wall 3 allow the bimetallic spring 16 to spring up and also permit heat discharge therethrough to the outside of the holding cup. The lamp 9 is installed in the lamp socket or recess 10 radially formed in the cup bottom 4. The second positive potential contact part 6 is slotted or injection-molded into the cup bottom 4.

FIG. 3 shows a side view of the cigar lighter according to the invention in a partial sectional view along the section line III-III of FIG. 1. A spring contact 18 of the negative potential contact part 7 extends through the cup base 4 and with its interior end contacts an electrically conductive edge bead 12 of the igniter plug 17. By establishing electrical contact with the edge bead 12 of the igniter plug 17, spring contact 18 completes an electrical circuit from negative potential contact part 7 to igniter plug 17. Since the locking groove 21 is provided in the cup wall 3 of the holding cup 1, the spring contact 18 springs out when the igniter plug 17 is inserted and then springs back to permit locking of the ignition plug 17 in the holding cup 1.

FIG. 4 shows a top view of the arrangement of the contact parts 5, 6, 7 of the cigar lighter according to the invention in a second exemplary embodiment, in which the contact parts 5, 6, 7, which contact an on-board electric connection plug (not shown), are arranged as a coaxial connection. The lamp socket 10 with the lamp 9 installed therein is provided in the radial direction in the cup bottom 4.

FIG. 5 shows a side view of the cigar lighter according to the invention in a partial sectional view along the section line V—V of FIG. 4. FIG. 5 also shows the formation of clamping ribs 20 formed on the surface of the cup wall 3. The clamping ribs 20 are arranged in rotationally symmetrical groups 24 of clamping ribs 20. Each group 24 includes clamping ribs of differing lengths, and different distances from illumination ring 19. The distance of the end of a clamping rib 20 from the illumination ring 19 molded onto the cup wall 3 corresponds to the wall thickness of the dashboards 23 to be provided with the cigar lighter of the present invention. Instead of the clamping ribs 20, steel springs (not shown) can, of course, also spring out behind the dashboards and lock the cup wall 3 to the dashboard 23. Moreover, any appropriate known fastening means with similar action, as regards jolt-proof and torsion-resistant locking of the holding cup 1, can also be used.

We claim:

1. Electric cigarette lighter suitable for installation in the dashboard of a motor vehicle, comprising an igniter plug having an electrically conductive incandescent head and an edge bead on one end thereof in circuit with said incandescent head, and a holding cup means for removably receiving the igniter plug therein, and having a front side, a rear side, a cup wall, a cup bottom and contact parts means, including at least one positive potential contact part and at least one negative contact part, for establishing electrical contact with a connecting plug disposed behind a front side of the dashboard, at least said cup wall being made of light-conducting and electrically insulating material, the holding cup means having at the front side an illuminating ring and at the rear side a lamp socket in the cup bottom, with the contact part means projecting from the rear side inside the space defined by an axial extension of the cup wall, said holding cup means for receiving the igniter plug therein, and further including a bimetallic spring contact located on an inside cup wall of the holding cup means in electrical connection with a positive potential contact part and with an ignition dish of the incandescent head when the igniter plug is received in the holding cup means, said negative potential contact part including at least one spring contact means extending through the cup bottom for electrically engaging the igniter plug edge bed to complete the circuit to said incandescent head and retaining the igniter plug in the holding cup means.

2. Lighter of claim 1, wherein the bimetallic spring contact is essentially in a U-shape.

3. Lighter of claim 2, wherein the bimetallic spring contact has a contact strip.

4. Lighter of claim 2, wherein the bimetallic spring contact is retained in electrical contact with a positive potential contact part by an electrically conducting screw which extends through the cup bottom.

5. Lighter of claim 1, wherein one of a positive potential contact part and a negative potential contact part penetrates the cup bottom centrally thereof, and the other penetrates the cup bottom at an off-center location.

6. Lighter of claim 5, wherein a positive potential contact part and a negative potential contact part are in the form of contact lugs and are arranged relative to each other in the form of a T.

7. Lighter of claim 1, further including a second positive potential contact part.

8. Lighter of claim 7, wherein the second positive contact part extends through the cup bottom at an off-center location.

9. Lighter of claim 7, wherein the second positive potential contact part slots into the cup bottom.

10. Lighter of claim 7, wherein the second positive potential contact part is injected molded into the cup bottom.

11. Lighter of claim 7, wherein the contact parts are arranged relative to each other in the shape of an I.

12. Lighter of claim 5 or 7, wherein the contact parts are coaxially arranged in the form of hollow cylindrical ring contacts.

13. Lighter of claim 1, wherein the lamp socket is located axially centrally of the cup bottom or off-center, and is open on the connector plug side of the holding cup.

14. Lighter of claim 1, wherein the lamp socket is radially aligned in the cup wall proximate the rear side and a positive potential contact part centrally extends through the cup bottom and defines a bore which corresponds to the diameter of a lamp received in the lamp socket.

15. Lighter of claim 1, including lamp connection wires which are in electrical connection with the negative potential contact part and a positive potential contact part.

16. Lighter of claim 1, wherein the interior of the cup wall has a locking groove located at the level of an end of the spring contact means.

17. Lighter of claim 16, including passage means in the cup wall between the cup bottom and the locking groove for venting the holding cup and for permitting expansion of the bimetallic spring contact.

18. Lighter of claim 1, wherein a thermally insulating, relatively heat proof member is provided between the cup bottom and the bimetallic spring contact.

19. Lighter of claim 1, wherein the cup bottom is made of thermally insulating, relatively heat proof material.

20. Lighter of claim 19, wherein the cup bottom is in the form of an insert in the holding cup.

21. Lighter of claim 18, wherein the member includes protective walls which are located between at least some contact parts and the cup wall between the cup bottom and the front side end of the contact parts.

22. Lighter of claim 1, wherein the cup wall is in the shape of a hollow cylinder and the cup bottom is cylindrical in shape.

23. Lighter of claim 1, wherein the cup bottom is chamfered in the form of a truncated cone.

24. Lighter of claim 1, including fixing means for retaining the holding cup in the dashboard.

25. Lighter of claim 24, wherein the fixing means are a plurality of clamping ribs provided on the exterior of the cup wall.

26. Lighter of claim 25, wherein each clamping rib means has run-on and/or run-off slopes.

27. Lighter of claim 25, wherein the clamping rib means have cross-sectional profile means for elastic movement to first spring in during the operation of sliding the holding cup into a dashboard and to then spring up in retaining engagement with the back wall of the dashboard.

28. Lighter of claim 25 or 27, wherein the clamping rib means are positioned equidistantly and axially parallel to each other.

29. Lighter of claim 25 or 27, wherein the clamping rib means are arranged in a plurality of rotationally symmetrically arranged groups, with each clamping rib member of a group being located a different distance from the front end of the holding cup.

30. In an electric cigar lighter suitable for installation in the dashboard of a motor vehicle, comprising at least one positive potential contact part and at least one negative potential contact part, the contact parts being connectible in electrical contact with a connecting plug located behind the dashboard, an igniter plug having an edge bead and an incandescent head including an ignition dish, and a holding cup having a front end, a rear end, a cup wall and a cup bottom, and being at least in part made of light-contacting and electrically insulating material, a luminous ring located at the front side and a lamp socket provided at the rear side in the cup bottom, the contact parts projecting from the rear side of the holding cup inside the space defined by an axial extension of the cup walls, the improvement comprising the exterior of the holding cup generally corresponding to the exterior of the igniter plug for receiving the ignition plug therein, a bimetallic spring contact means in electrical contact with a positive potential contact part for contacting the incandescent head igniter dish when the ignition plug is inserted into the holding cup, the bimetallic spring contact means being disposed on an inside wall of the cup wall, and at least one negative potential contact part means extending through the cup bottom for electrically contacting and engaging the edge bead of the igniter plug.

* * * * *